United States Patent [19]

Ruottu

[11] Patent Number: 5,211,002

[45] Date of Patent: May 18, 1993

[54] PROCESS AND AN EQUIPMENT FOR THE RECOVERY OF ENERGY AND CHEMICALS IN A SULPHATE PROCESS

[75] Inventor: Seppo Ruottu, Karhula, Finland

[73] Assignee: Tampella Power Oy, Tampere, Finland

[21] Appl. No.: 832,891

[22] Filed: Feb. 10, 1992

[30] Foreign Application Priority Data

Feb. 14, 1991 [FI] Finland .................. 910730

[51] Int. Cl.$^5$ ............................ F23G 5/12; F02G 3/00
[52] U.S. Cl. .................. 60/39.02; 60/39.12; 110/229; 48/197 R
[58] Field of Search ............ 60/39.02, 39.05, 39.12; 110/229; 48/197 R, 209, 203; 162/30.1, 30.11

[56] References Cited

U.S. PATENT DOCUMENTS

| | | | |
|---|---|---|---|
| 2,944,396 | 7/1960 | Barton et al. | 60/39.12 |
| 3,718,446 | 2/1973 | Brink et al. | 48/197 R |
| 3,759,036 | 9/1973 | White | 60/39.12 |
| 4,013,560 | 3/1977 | Pradt | 60/39.05 |
| 4,135,968 | 1/1979 | Dehaas | 48/209 |
| 4,574,714 | 3/1986 | Bach et al. | 48/197 R |
| 4,682,985 | 7/1987 | Kohl | 48/209 |
| 4,773,918 | 9/1988 | Kohl | 48/197 R |
| 4,930,429 | 6/1990 | Ryham | 110/229 |

FOREIGN PATENT DOCUMENTS 81847 8/1990 Finland .

Primary Examiner—Richard A. Bertsch
Assistant Examiner—Howard R. Richman
Attorney, Agent, or Firm—Banner, Birch, McKie & Beckett

[57] ABSTRACT

The invention relates to a method and an equipment for the recovery of energy and chemicals in a sulphate process, wherein black liquor is passed into a gasification reactor (3) in which it is gasified at a pressure above the atmospheric pressure in the presence of an amount of oxygen smaller than the stoichiometric amount, whereby inorganic compounds are recovered as liquid-phase compounds useable in the present pulping process, and the energy of the organic compounds of black liquor is bound mainly to the chemical compounds of the gas phase. Gases formed in the gasification, containing sodium compounds, are passed into a particle cooler (4), in which the compounds are brought into solid state. Gases cooled in the particle cooler (4) are purified by a filter (5) and then passed into a gas turbine (7).

19 Claims, 2 Drawing Sheets

PROCESS AND AN EQUIPMENT FOR THE RECOVERY OF ENERGY AND CHEMICALS IN A SULPHATE PROCESS

The invention relates to a process based on the use of a gas turbine and a compressor operated by the gas turbine for the recovery of energy and chemicals in a sulphate process, wherein black liquor having a dry solids content of typically 60 to 80% is passed into a gasification reactor in which it is gasified at a pressure above the atmospheric pressure in the presence of an amount of oxygen smaller than the stoichiometric amount by introducing hot air into the gasification reactor, the air being compressed to a pressure above the atmospheric pressure by the compressor, whereafter sodium compounds are separated from the gas, which is further passed into the gas turbine. In this process, inorganic compounds are recovered as liquid-phase compounds useable in the present pulping process, and the energy of the organic compounds of the black liquor is bound mainly to the chemical compounds of the gas phase.

In the present sulphate process, the recovery of the chemicals and energy of black liquor takes place in a so-called soda recovery boiler. The lower portion of the boiler is kept strongly reductive by stagewise introduction of air. From the soda recovery boiler, chemicals are recovered mainly as liquid phase compounds $Na_2S$ and $Na_2CO_3$. The chemical energy of black liquor is utilized to generate steam in the soda recovery boiler, and the steam is then expanded in a steam turbine. The necessary process steam for the pulping process is produced to some extent by bled steam and mainly by so-called back-pressure steam obtained after the turbine. The back-pressure level required by the pulping process is about 0.4 MPa, wherefore the ratio of expansion of the steam in the turbine remains low. The most severe disadvantage of the recovery process based on the use of the soda recovery boiler is, in fact, the low output of electricity. The cost of investment of the recovery process based on the soda recovery boiler also calls for the development of a more purposeful recovery process.

Among the previously known energy processes, the most feasible possibility to increase substantially the output of electricity in the recovery operation of a pulping process seems to be offered by the gas turbine. There are many patent applications in which the most important feature is the production of electricity by means of the gas turbine, such as FI Patent Application 875056 (Andersson) and International Patent Application WO 86/07396 (Kignell). These patent documents, which overlap in many respects, define comprehensively e.g. the conditions of the gasification reactor and suitable processes for the recovery of chemicals in different conditions.

FI Patent Application 875056 discloses a process in which the gasification is attempted to be carried out in such a low temperature that sodium compounds remain in solid phase and sulphur is mainly bound into $H_2S$. A problem with this process is the recovery of sulphur, and the causticizing plant is considerably larger than at present.

International Patent Application WO 86/07396 discloses a process in which sodium compounds are recovered mainly as $Na_2S$ and $Na_2CO_3$, so that it resembles the present recovery process from the viewpoint of cellulose chemistry.

A feature common to all prior art processes is that the gases from the gasification step are treated by wet purification techniques, thus wasting the energy which could be utilized in the gas turbine. There is also evidence that the wet techniques are not sufficiently efficient in removing sodium compounds escaping from the gasification reactor, wherefore the service life of the blade assembly of the gas turbine is uneconomically short when such wet techniques are used.

Gases from the gasification reactor contain great amounts of sodium in liquid and vapour phase, and so a cooler based on indirect transfer of heat is difficult to keep clean. Another problem with the use of recuperative coolers is the extremely small size of particles forming in the phase transition of vaporized sodium, which makes it practically impossible to separate them. These problems associated with the recovery processes based on the use of the gas turbine have not previously been solved satisfactorily.

The object of the present invention is to optimize the production of electricity and steam and to solve the above-mentioned problems.

This object is achieved by means of a process according to the invention which is characterized in that the hot air is introduced into the gasification reactor in such a way that the temperature of the gasification reactor ranges between 800° and 1,200° C., sodium sulphide and sodium carbonate compounds being thus converted into molten state; that said molten mixture of sodium sulphide and sodium carbonate is passed out of the gasification reactor for recovering it; that the hot gases still containing molten and vaporized sodium are passed from the gasification reactor into a particle cooler which contains solid particles and through which the air from the compressor, compressed to a pressure above the atmospheric pressure, is passed so that the temperature of the particle cooler is between 300° and 600° C., whereby the sodium compounds are brought into solid state in the particle cooler; that at least part of the air heated in the particle cooler is passed into the gasification reactor; and that the gases cooled in the particle cooler are purified by a filter and then passed into the gas turbine.

The invention is also concerned with an equipment for the recovery of energy and chemicals in a sulphate process, the equipment comprising a gasification reactor, a compressor for blowing hot air into the gasification reactor, means for separating sodium compounds from gases formed in the gasification reactor, a gas turbine, means for purifying the gases, and means for passing the gases into the gas turbine. The equipment is characterized in that said means for separating sodium compounds from the gases includes a particle cooler; that the equipment further comprises means for passing air from the compressor, compressed to a pressure above the atmospheric pressure, through the particle cooler so that the gases are cooled and the sodium compounds brought into molten state in the gasification reactor are brought into solid state; that the equipment further comprises means for passing the air heated in the particle cooler into the gasification reactor; and that the purification means comprise a filter for purifying the gases of particles; and means for passing the purified gas into the gas turbine.

The most essential characteristic features of the invention are associated with the cooling of gases from the gasification reactor by utilizing a so-called particle cooler and a filter.

In the following the invention will be described in detail with reference to the attached drawings.

BRIEF DESCRIPTION OF THE DRAWINGS

Referring to FIG. 1, black liquor from one or more sources of liquor is fed through feed conduits 1a and 1b into an evaporator 1 which may be a fluidized-bed evaporator or any other evaporator suited for the purpose. In the evaporator 1, water is evaporated from the liquor at elevated temperature so that the dry solids content of the liquor is typically 60 to 80%. To improve evaporation, hot gas and steam are circulated through a conduit 1c by a pump 2 and then returned to the lower portion of the evaporator 1. Through a conduit 1d the concentrated liquor is passed into a gasification reactor 3, into which air heated in a particle cooler 4 is also introduced through a conduit 4a so that the temperature in the gasification reactor 3 will be within the range from 800° to 1,200° C., preferably within the range from 900° to 1,100° C. Air is thereby introduced into the gasifier in an amount of 40 to 50 mole/kg dry solids. Nearly all of the air compressed by a compressor 8 and having a final temperature between 270° and 350° C. after compression, depending on the ratio of compression, is passed into the particle cooler 4 so that the temperature of the particle cooler is between 300° and 600° C., preferably between 400° and 500° C. A molten mixture of sodium sulphide and sodium carbonate is recovered from the gasification reactor 3 and passed through a conduit 3a to a dissolver. Hot gases containing molten and vaporized sodium are passed from the gasification reactor into the particle cooler 4, in which the gases are cooled by an air flow from the compressor for purification, and the sodium compounds are brought into solid state.

Figure 1:
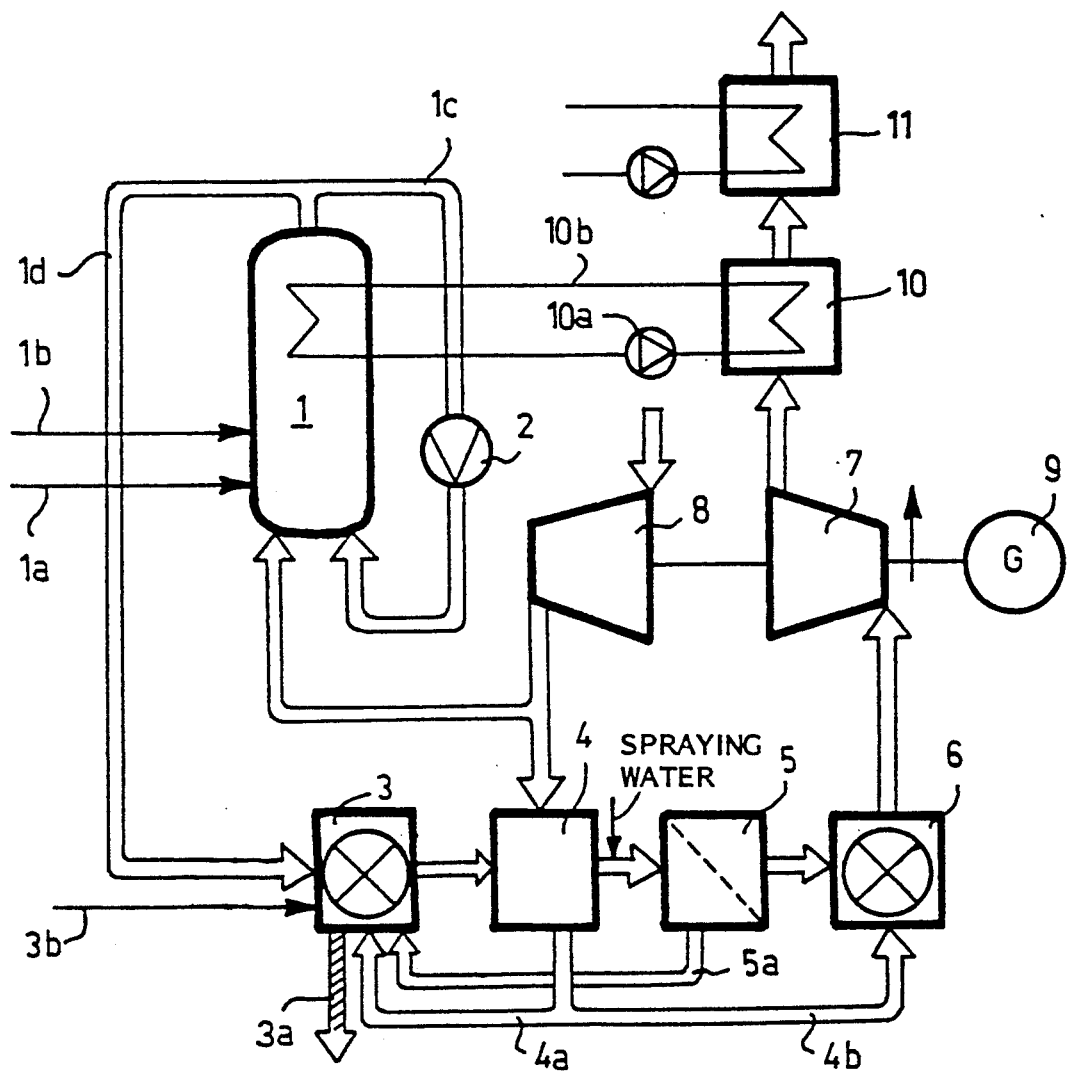
FIG. 1 shows a flow chart illustrating a recovery process according to the invention.

As used herein, the particle cooler means an apparatus in which gases are brought into contact with solid particles so as to cool them rapidly. In view of the recovery process, two major advantages are obtained by the particle cooler:

1) sodium compounds contained in the gases, problematic for the heat surfaces adhere to the surface of the solid particles, and so they do not cause contamination of the heat surfaces, and 2) as there is plenty of condensation nuclei available for vaporized sodium, the amount of submicro particles, that is, extremely small particles, difficult to separate remains insignificant.

The particle cooler may be e.g. a fluidized bed the temperature of which is adjusted by cooling. Preferably, a mixture of the cooking chemicals $Na_2S$ and $Na_2CO_3$ is used as the nucleation material in the particle cooler, whereby no foreign chemicals hampering the cooking process are needed. Sand may also be used as nucleation material.

Sodium compounds gathering in the particle cooler are recycled to the gasification reactor, from where they are passed into a dissolver to form green liquor therein.

In the particle cooler the gases from the gasification reactor are cooled to a temperature such that they can be purified by a simple and efficient filter 5. The filter may be e.g. a fibre filter or a ceramic filter. Today, a suitable operating temperature for the most widely used fibre filter materials is about 200° to 250° C. It is not possible to achieve this temperature by the air flow from the compressor, the entrance temperature of which is about 300° C. In view of the production of electricity, however, no substantial losses occur even though the gases are cooled to this particular temperature by direct water cooling, as the energy bound to the steam can thus be converted into energy in the turbine with a high efficiency without any significant increase in the compression work.

Sodium dust accumulating in the filter 5 is fed through a conduit 5a back to the gasification reactor 3, from which it is removed in molten state into the green liquor dissolver.

The gases, which are now almost completely free from alkalis, are passed together with air heated in the particle cooler 4 into a combustion chamber 6 in a gas turbine. In the combustion chamber the post-combustion temperature is adjusted by the amount of air from a conduit 4b to a maximum temperature determined by the gas turbine 7; with the present technology, the maximum temperature ranges between 850° and 1,000° C., depending on the type of turbine and the manufacturer. In the gas turbine 7, the hot gases expand and the mechanical energy released in the expansion work is used partly in the compressor 8 and partly in a generator 9.

The temperature of the exhaust gases of the gas turbine 7 is about 450° C., so their thermal enthalphy can be used to generate the necessary process steam for the pulping process. Depending on the application, it is possible to use one or more boilers, whereby the production of steam can be optimized when using different steam pressure levels in accordance with the requirements of the pulping process.

In the embodiment of the invention shown in FIG. 1, the process includes an option to use part of the energy of the exhaust gases for the production of steam at 6.0 MPa in a boiler 10, from which the steam is passed indirectly into the pressurized evaporator 1 for black liquor, e.g. in a closed cycle as shown in the flow chart. In the closed cycle, the steam is circulated by a pump 10a through a closed pipe system 10b so that the steam heated in the boiler 10 flows into the evaporator 1, from which the condensed steam is pumped by the pump 10a back into the boiler. This process arrangement is necessary if the dry solids content of black liquor after the evaporating plant of the pulping process would otherwise remain low. It would be advantageous to the gasification process to increase a dry solids content of 60%, for example, to a minimum level of 75 to 80%. A characteristic feature of the evaporator 1 is, in fact, that the evaporation is preferably continued until the black liquor turns into dry powder, and the powder is then transported with the evaporated steam through the conduit 1d into the gasification reactor 3. If required, additional fuel can be introduced into the gasification reactor 3 through a conduit 3b in order to ensure that sufficiently heat energy is supplied for the gasification.

To further improve the efficiency of the process, the gases from the boiler 10 can be passed further into a boiler 11, from which low-pressure steam (1.0 MPa) is obtained for the general use of the plant.

A pulp mill furnished with a recovery system according to the present invention will be described below by way of example. 10 kg of dry black liquor, corresponding to the capacity of a rather small present-day pulp mill, is used as a reference quantity. The following assumptions are based on parameter values realistic in view of the present technology.

Black liquor is selected as a basis for the compound and energy balances, the elementary analysis of the dry solids of black liquor being as follows:

| Element: | C | H | O | N | S | Na |
|---|---|---|---|---|---|---|
| Parts by weight: | 0.352 | 0.037 | 0.358 | 0.0 | 0.047 | 0.206 |
| Effective thermal value of dry solids | | | 14 MJ/kg | | | |
| Temperature of gasification reactor | | | 950° C. | | | |
| Temperature of air before gasification reactor | | | 400° C. | | | |
| Temperature of black liquor | | | 150° C. | | | |
| Flow of dry solids | | | 10 kg/s | | | |
| Compressor pressure ratio | | | 10 | | | |
| Turbine pressure ratio | | | 9 | | | |
| Temperature of air after compressor | | | 306° C. | | | |
| Temperature of gas before turbine | | | 900° C. | | | |

The process calculation is based on the maximization of electricity output, so that process steam is generated only by the exhaust gases of the gas turbine.

In the following, the compound and energy balances are specified for the process arrangement of FIG. 1 in three different cases:

1. Water contained in black liquor (0.25 kg/kg dry solids) is fed as water into the gasification reactor. The amount of air for gasification is adjusted so that the calculatory temperature of the gasification reactor is 950° C.

2. Water contained in black liquor (0.25 kg/kg dry solids) is fed as steam into the gasification reactor. The amount of air for gasification is adjusted so that the calculatory temperature of the gasification reactor is 950° C.

3. Otherwise as in the case 1 except that the dry purification of gases is replaced with wet purification in which the gases are cooled with 15° C. water to 115° C. The results of the balance calculations are shown in Table 1.

As compared with the prior art recovery process based on the soda recovery boiler, all electricity outputs shown in Table 1 are nearly double. In addition, the cost of investment of the recovery process based on the use of the gas turbine are substantially smaller than that of the process based on the soda recovery boiler. It appears from Table 1 that when wet purification is used, the electricity output is clearly smaller than when using the dry process according to the present invention. Another major disadvantage of the wet purification techniques is the poor alkali separation ability, as a result of which the service life of the gas turbine remains uneconomically short.

Figure 2:
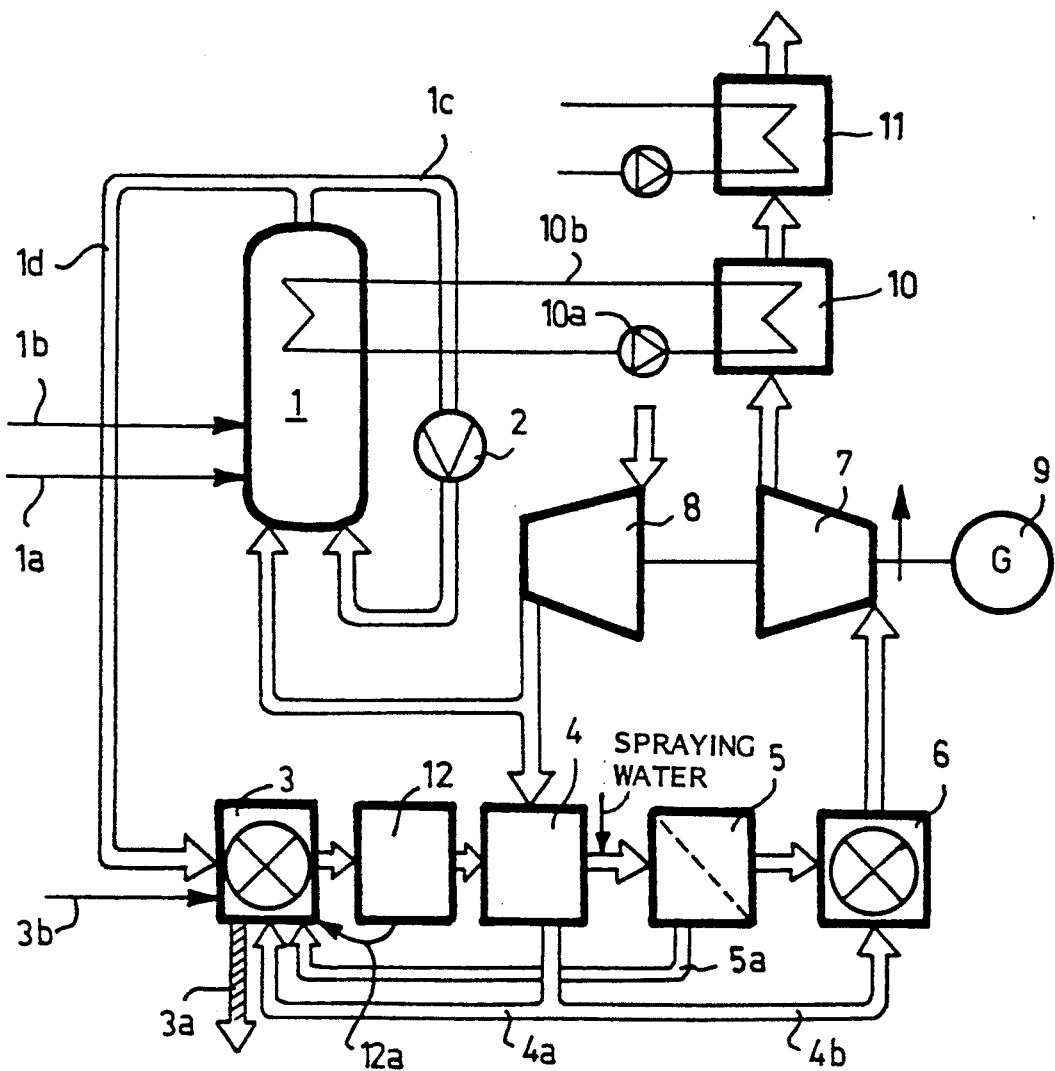
FIG. 2 shows a flow chart illustrating another embodiment of the invention.

FIG. 2 shows a process corresponding in essential parts to that shown in FIG. 1 with the exception that it further comprises a melt cyclone indicated with the reference numeral 12. In practice, the melt cyclone is positioned within the gasifier 3. Its function is to separate the largest melt particles from the hot gases before the gases are passed from the gasifier to the particle cooler. The arrow 12a shows how the material separated in the melt cyclone passes through the gasifier to be further discharged into the dissolver, as shown by the arrow 3a.

The figures show certain embodiments of the present invention. In their details, the process and the equipment according to the invention may vary within the scope of the claims. For instance, the construction stage of the process can be adapted to each particular mill by generating part of the process steam in the particle cooler or by a boiler positioned between the combustion chamber and the gas turbine.

TABLE 1

Results from comparative balance calculations for 10 kg batch of dry black liquor Case 1: Water/dry solids ratio 0.25; no fluidized-bed evaporator; dry purification of gas.
Case 2: water/dry solids ratio 0.25; fluidized-bed evaporator; dry purification of gas.
Case 3: Water/dry solids ratio 0.25; no fluidized-bed evaporator; wet purification of gas.

| | 1 | | 2 | | 3 | |
|---|---|---|---|---|---|---|
| Incoming flows: | kJ | kg | kJ | kg | kJ | kg |
| Lhv of dry solids | 133,951 | 10 | 140,187 | 10 | 133,951 | 10 |
| Thermal energies: | | | | | | |
| Dry solids 420K | 2,147 | 10 | 2,147 | 10 | 2,147 | 10 |
| Water 420K | 1,358 | 2.5 | 0 | 0 | 1,365 | 2.5 |
| Steam 420K | 0 | 0 | 575 | 2.5 | 0 | 0 |
| Air 228K | −1,546 | 157 | −1,672 | 170 | −1,152 | 117 |
| Compression 288–579K | 46,607 | | 50,394 | | 34,738 | |
| Wash water 298K | 0 | 0 | 0 | 0 | 0 | 62 |
| Total input: | 182,527 | 169.5 | 191,631 | 182.5 | 171,062 | 191.5 |
| Outgoing flows: | | | | | | |
| Flue gases: | kJ | kg | kJ | kg | kJ | kg |
| Expansion 1,173–748K | 83,411 | 165 | 87,920 | 178 | 64,133 | 125.5 |
| Boiler 748–440K | 55,959 | | 59,014 | | 42,937 | |
| Flue gas loss 440–298K | 24,300 | | 25,682 | | 18,638 | |
| Melt: | | | | | | |
| Sensible heat 1,173–298K | 5,277 | 4.5 | 5,259 | 4.5 | 5,277 | 4.5 |
| Chemical energy | 13,549 | | 13,751 | | 13,549 | |
| Total output: | 182,496 | | 191,526 | | 171,064 | |
| Shaft power of turbine: | 36,804 | | 37,526 | | 29,386 | |

I claim:

1. A process based on the use of a gas turbine and a compressor operated by the gas turbine for the recovery of energy and chemicals in a sulphate process, wherein black liquor having a dry solids content of typically 60 to 80% is passed into a gasification reactor in which it is gasified at a pressure above the atmospheric pressure in the presence of an amount of oxygen smaller than the stoichiometric amount by introducing hot air into the gasification reactor in such a way that the temperature of the gasification reactor ranges between 800° and 1,200° C., the air being compressed to a pressure above the atmospheric pressure by the compressor, whereafter sodium sulphide and sodium carbonate compounds thus converted into molten state are passed out of the gasification reactor as a molten mixture of the sodium sulphide and the sodium carbonate; the hot gases still containing molten and vaporized sodium are passed from the gasification reactor into a particle cooler which contains solid particles as heat transfer and nucleation material and through which the air from the compressor, compressed to a pressure above the atmospheric pressure, is passed so that the temperature of the particle cooler is between 300° and 600° C., whereby the sodium compounds are brought into solid state in the particle cooler; at least part of the air heated in the particle cooler is passed into the gasification reactor; and the gases cooled in the particle cooler are purified in a filter and then passed into the gas turbine.

2. A process according to claim 1, wherein the dry solids content of the black liquor is between 75 and 80%.

3. A process according to claim 2, wherein the black liquor is evaporated indirectly, in an evaporator, by steam generated in a boiler to which the exhaust gases of the gas turbine are connected, the black liquor being converted into substantially dry powder which is transported to the gasification reactor together with the evaporated steam.

4. A process according to claim 1, wherein a mixture of the cooking chemicals $Na_2S$ and $Na_2CO_2$ is used as a particle-shaped heat transfer and nucleation material in the particle cooler.

5. A process according to claim 1, wherein the gasification temperature is between 900° and 1,100° C.

6. A process according to claim 1, wherein the temperature of the particle cooler is between 400° and 500° C.

7. A process according to claim 1, wherein the black liquor is evaporated indirectly, in an evaporator, by steam generated in a boiler to which the exhaust gases of the gas turbine are connected, the black liquor being converted into substantially dry powder which is transported to the gasification reactor together with the evaporated steam.

8. A process according to claim 1, wherein sodium dust accumulating in the filter is recycled into the gasification reactor.

9. A process according to claim 1, wherein the gas temperature is reduced after the particle cooler before the filter to a temperature between 200° and 250° C.

10. A process according to claim 9, wherein sodium compounds are separated from the gases by a fibre filter.

11. A process according to claim 1, wherein the mechanical energy released in the expansion work in the gas turbine is used partly in the compressor and partly in a generator.

12. An apparatus for the recovery of energy and chemicals in a sulphate process, the equipment comprising a gasification reactor, a compressor for blowing hot air into the gasification reactor, means for separating sodium compounds from gases formed in the gasification reactor, said means for separating sodium compounds from the gases including a particle cooler; a gas turbine, means for passing air from the compressor, compressed to a pressure above the atmospheric pressure, through the particle cooler so that the gases are cooled and the sodium compounds brought into molten state in the gasification reactor are brought into solid state; means for passing the air heated in the particle cooler into the gasification reactor; a filter for purifying gases of particles and means for passing the gases into the gas turbine.

13. The apparatus according to claim 12, wherein the filter is a fibre filter positioned between the particle cooler and the gas turbine.

14. The apparatus according to claim 12 wherein the particle cooler is a fluidized bed.

15. The apparatus according to claim 12, wherein the particle cooler contains a mixture of $Na_2S$ and $Na_2CO_3$ as nucleation material.

16. The apparatus according claim 12, wherein the apparatus further comprises a boiler for generating steam from the exhaust gases of the gas turbine; and an evaporator into which the steam generated in the boiler is passed for concentrating the black liquor.

17. The apparatus according to claim 12, wherein the mechanical energy released in the expansion work of the gas turbine is used partly in the compressor and partly in a generator connected to the apparatus.

18. The apparatus according to claim 12, wherein the apparatus comprises a melt cyclone positioned within the gasification reactor for separating molten particles from the hot gases before the gases are introduced into the particle cooler.

19. The apparatus according to claim 12, wherein the particle cooler contains sand as nucleation material.

* * * * *